US011252291B2

(12) United States Patent
Nakagawa

(10) Patent No.: US 11,252,291 B2
(45) Date of Patent: Feb. 15, 2022

(54) IMAGE FORMING APPARATUS WITH HISTORY RECORD DISPLAY INFORMATION AND METHOD OF CONTROLLING IMAGE FORMING APPARATUS

(71) Applicant: SHARP KABUSHIKI KAISHA, Sakai (JP)

(72) Inventor: Kanji Nakagawa, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 17/102,908

(22) Filed: Nov. 24, 2020

(65) Prior Publication Data

US 2021/0160387 A1    May 27, 2021

(30) Foreign Application Priority Data

Nov. 26, 2019  (JP) .............................. JP2019-213332

(51) Int. Cl.
*H04N 1/00*  (2006.01)
(52) U.S. Cl.
CPC ..... *H04N 1/00517* (2013.01); *H04N 1/00437* (2013.01); *H04N 1/00482* (2013.01); *H04N 2201/0094* (2013.01)
(58) Field of Classification Search
None
See application file for complete search history.

(56) References Cited

U.S. PATENT DOCUMENTS

| 8,117,349 | B2 * | 2/2012 | Murata | H04N 1/00482 710/8 |
| 8,334,988 | B2 * | 12/2012 | Sekine | G03G 15/502 358/1.13 |
| 8,531,688 | B2 * | 9/2013 | Okada | H04N 1/00411 358/1.13 |
| 8,938,691 | B2 * | 1/2015 | Murata | H04N 1/00413 715/810 |
| 9,334,988 | B2 * | 5/2016 | Gallagher | F16L 25/065 |
| 10,552,093 | B2 * | 2/2020 | Nakaya | H04N 1/00832 |
| 2005/0111866 | A1 | 5/2005 | Sato | |
| 2018/0139343 | A1 * | 5/2018 | Igawa | H04N 1/00344 |

(Continued)

FOREIGN PATENT DOCUMENTS

JP    2005-153346 A    6/2005
JP    2006-220940 A    8/2006

*Primary Examiner* — Henok Shiferaw
(74) *Attorney, Agent, or Firm* — ScienBiziP, P.C.

(57) ABSTRACT

It is assumed that a user changed a set value of paper selection, which is one of setting items of various setting items, from "auto" to "A3". According to one embodiment, a controller extracts history records in which the set value of the paper selection is "A3" from setting information history in a storage, and arranges them to the side of the various setting items in chronological order. Specifically, the controller displays three pieces of setting information, starting with the latest setting information, followed by older setting information, on the right side of the various setting items. In displaying the pieces of setting information, in order to clarify and highlight parts having discrepancies relative to the set values of the various setting items, the color may be changed, a box may be used to surround such a part, or characters may be displayed in bold.

7 Claims, 10 Drawing Sheets

(56) References Cited

U.S. PATENT DOCUMENTS

2018/0217797 A1\* 8/2018 Inoue ................. H04N 1/00474
2019/0245989 A1\* 8/2019 Yoshida ................ G06F 3/1205
2019/0306349 A1\* 10/2019 Shino ................. H04N 1/00517

\* cited by examiner

IMAGE FORMING APPARATUS WITH HISTORY RECORD DISPLAY INFORMATION AND METHOD OF CONTROLLING IMAGE FORMING APPARATUS

BACKGROUND OF THE INVENTION

Field of the Invention

The present invention relates to an image forming apparatus and a method of controlling an image forming apparatus for presenting, in setting a set value of each of a plurality of setting items, setting candidates on the basis of history of setting operations.

Description of the Background Art

For example, in taking a copy of a document by an image forming apparatus such as a copier or a multifunction peripheral, various setting items, such as the number of copies for print, color or monochrome, whether a document is single-sided or double-sided, whether printing should be single-sided or double-sided, document size, print size, magnification, document reading exposure, and finishing after the printing, must be confirmed. A user needs to make the setting accurately for many setting items as described above, and it takes time and effort to make each of the settings and also to check whether there is no error in the settings.

Therefore, a technology to reduce a burden of the user operation, which is realized by recording a set of set values of the setting items in a device as "operation history", and allowing the same setting to be reused, has been known from the past. The above technology serves to reduce a burden of the setting operation, and reduce setting errors when the user makes complicated settings.

For example, in a copy operation performed by a digital copier, the user determines whether the initial values displayed on an operation panel are as desired by the user for various setting items such as the document size, paper size, single-sided or double-sided copy, enlargement or reduction magnification, and copy density. The user changes the setting of the setting item that is different from the user's intention, and copy processing is executed as the user presses a start button. When the start button is pressed by the user, the device causes combinations of the settings to be stored within the device as the "operation history, together with the date and time. When a user identification means is used, user identification information is also stored.

The following are specific examples of conventional technologies in which such operation history is utilized.

In a device disclosed in Japanese Unexamined Patent Application Publication No. 2005-153346, when an "application mode" switch on a copy operation screen is pressed by the user, an application mode detailed setting screen is pop-up displayed. Further, if an "operation history" switch on the same screen is pressed, the screen being pop-up displayed is switched to an operation history detailed setting screen, and setting information configured by one of operation history records that are targets of display (for example, the latest operation history record) is displayed. Here, if an operation history record selection UI is operated by the user, the display is switched to display an operation history record according to the operation. Then, if an OK switch is pressed, the setting information of the operation history record currently being displayed is reflected on the copy operation screen, and the operation history detailed setting screen that has been pop-up displayed is closed.

Also, a device disclosed in Japanese Unexamined Patent Application Publication No. 2006-220940 switches a display to a copy operation screen, and displays setting information configured by an operation history record (for example, the latest one) among all the operation history records that are available. Here, if "Forward" or "Backward" operation is performed by the user, with respect to a sequence of operation history records that are arranged in a certain order (in the order currentness of the date and time of operation, for example), the display of the operation record is switched to the next or previous operation history record of the order according to a button operation. Then, if an OK switch is pressed, the setting information of the operation history record currently being displayed is reflected on the copy operation screen, and an operation history detailed setting screen that has been pop-up displayed is closed.

Furthermore, if a "Narrow Down" button on the same screen is pressed, the current state of the device is acquired, and only the history records including the current state are extracted and presented as targets of display. For example, if the above button is pressed in a state where an A4 document is placed, only the operation history records related to A4 copy are presented as the targets of display.

However, the devices disclosed in Japanese Unexamined Patent Application Publication No. 2005-153346 and Japanese Unexamined Patent Application Publication No. 2006-220940 are both intended to display selection candidates of the operation history records when the "application mode" switch is pressed from the copy operation screen, and the "operation history" switch is further pressed. If the user displays all of the selection candidates individually for browsing, but the expected operation history record is not displayed, it is necessary to once return to the copy operation screen and check the current settings and the state of the device.

In addition, in order to check which part of the settings is the same and which part is different in the current settings and the settings of the history records, it is necessary to perform a display operation of the corresponding setting. Thus, the operation is complicated and a difference is hard to confirm at a glance.

In view of the above circumstances, the present invention aims to provide an image forming apparatus and a method of controlling an image forming apparatus for displaying, in setting set values of a plurality of setting items, setting information such that the settings can be easily compared according to a change made to the initial set value.

SUMMARY OF THE INVENTION

The present invention relates to an image forming apparatus which performs job processing on the basis of setting information, which is information on a set value of a setting item, in which the image forming apparatus includes:

a display which displays a setting screen;

a storage which stores an initial set value, and setting information history which is configured by accumulation of the past setting information; and a controller which executes setting processing of determining the set value of the setting item, and the job processing, and the controller extracts, when the set value of the setting item is changed from the initial set value, at least one piece of setting information including the changed set value from the setting information history, and displays the extracted setting information as history record display information in such a way that the history record display information is selectable on the display.

In addition, the present invention relates to method of controlling an image forming apparatus which performs job processing on the basis of setting information, which is information on a set value of a setting item, in which the method includes:

displaying a setting screen;

storing an initial set value of the setting item, and setting information history which is configured by accumulation of the past setting information; and controlling of executing setting processing of determining the set value of the setting item, and the job processing, and the controlling extracts, when the set value of the setting item is changed from the initial set value, at least one piece of setting information including the changed set value from the setting information history, and displays the extracted setting information as history record display information in such a way that the history record display information is selectable in the displaying.

According to the present invention, when the user sets the set values of a plurality of setting items, history records of the related setting information are automatically displayed according to a change made to the initial set value. Therefore, an operation to display history records, which is a troublesome operation for the user, does not need to be performed. Consequently, time and effort can be saved and a setting operation can be performed efficiently. Moreover, the present invention performs the display such that the set values of the present setting items of the apparatus and the set values of the setting items of the setting information history can be easily compared, and that parts having discrepancies relative to the set values of the present setting items are clarified in the display. Consequently, it is possible for the user to easily compare the settings.

DESCRIPTION OF THE PREFERRED EMBODIMENTS

Embodiments of the present invention will now be described with reference to the accompanying drawings. Note that the embodiments described below are merely examples for describing the present invention, and the technical scope of the invention defined by the claims is not limited to the scope described in the present specification.

First Embodiment

In the following, a first embodiment of the present invention will be described with reference to the drawings.

Figure 1:
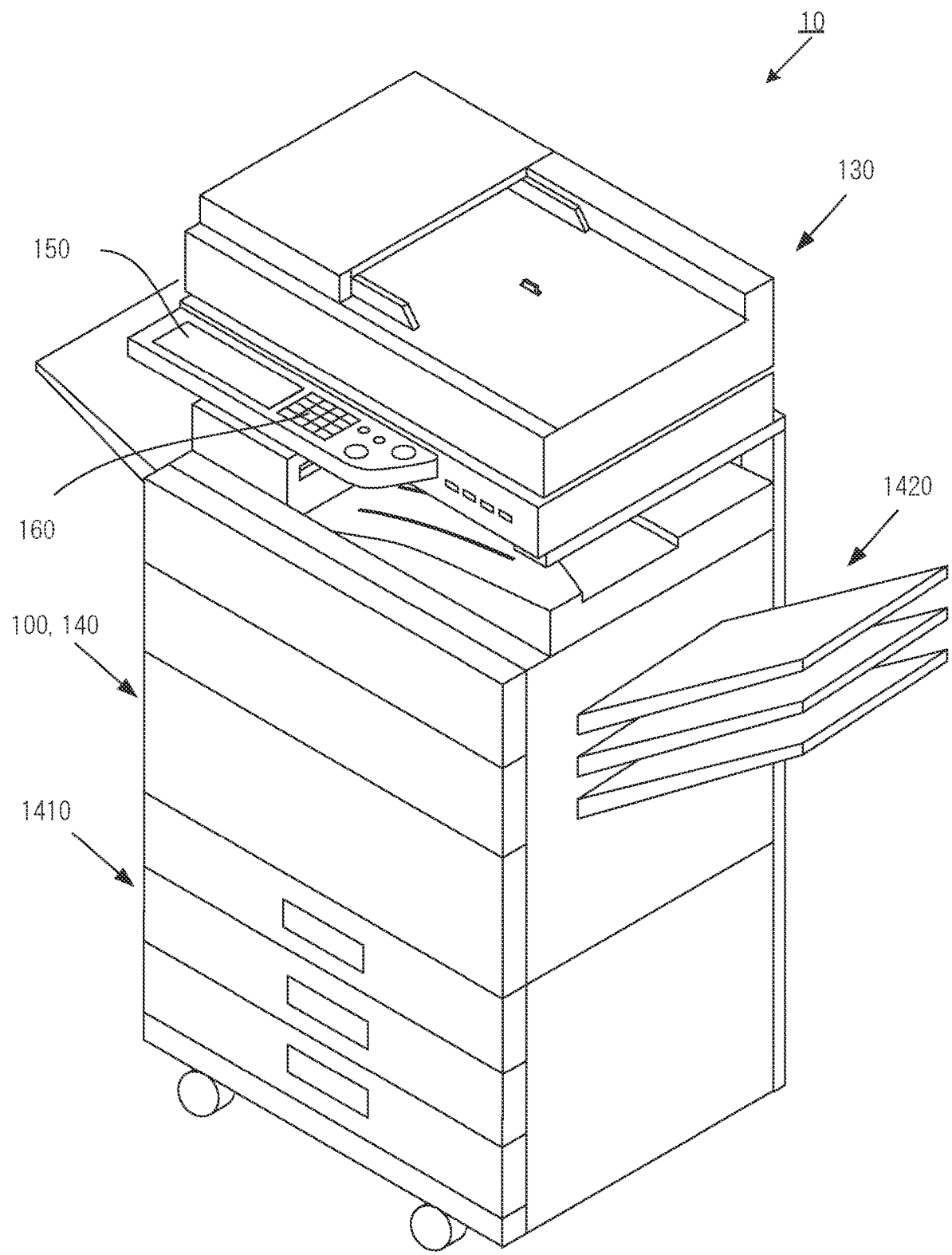
FIG. 1 is an explanatory diagram illustrating a configuration of an image forming apparatus according to a first embodiment of the present invention.
Figure 2:
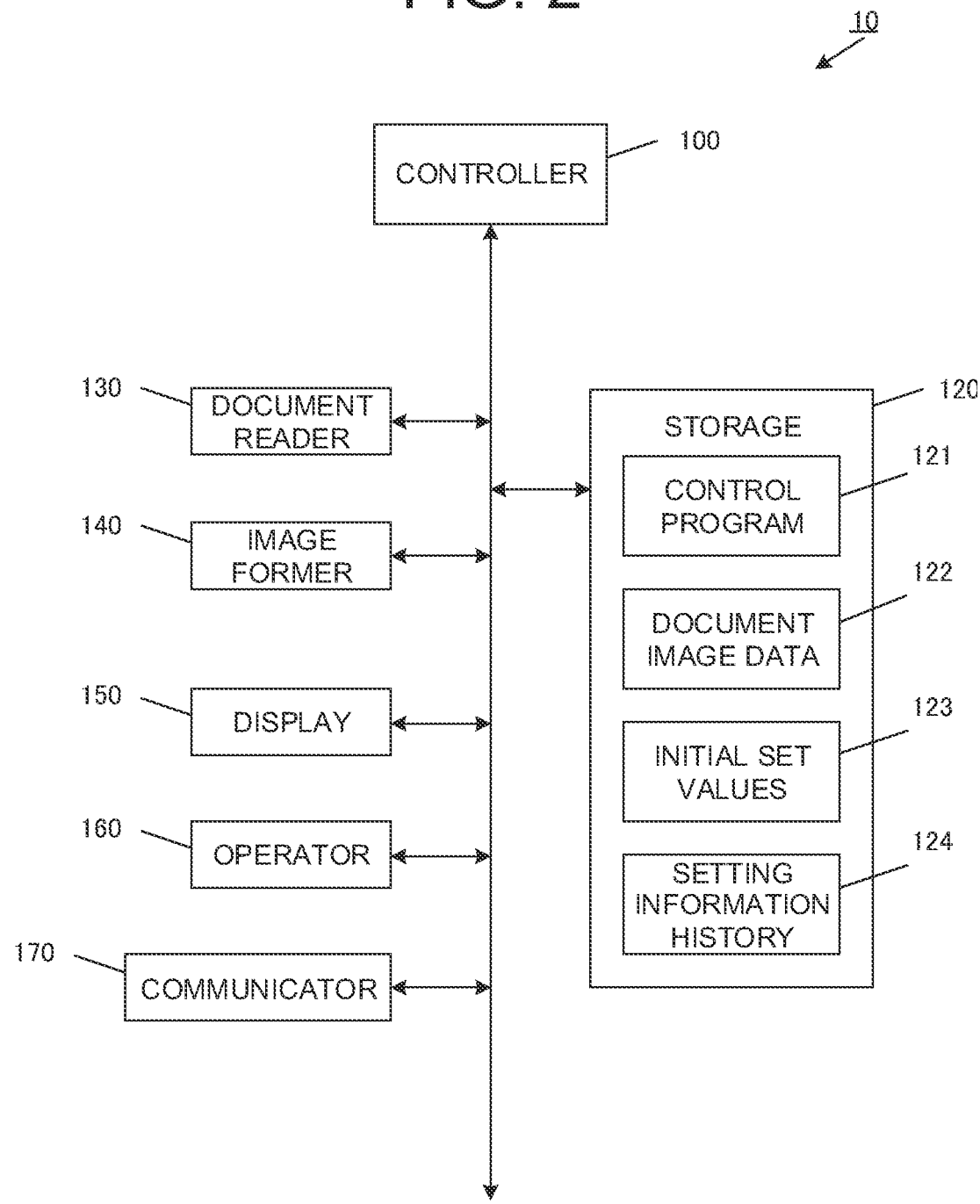
FIG. 2 is a block diagram illustrating a configuration of the image forming apparatus according to the first embodiment of the present invention.
Figure 3:
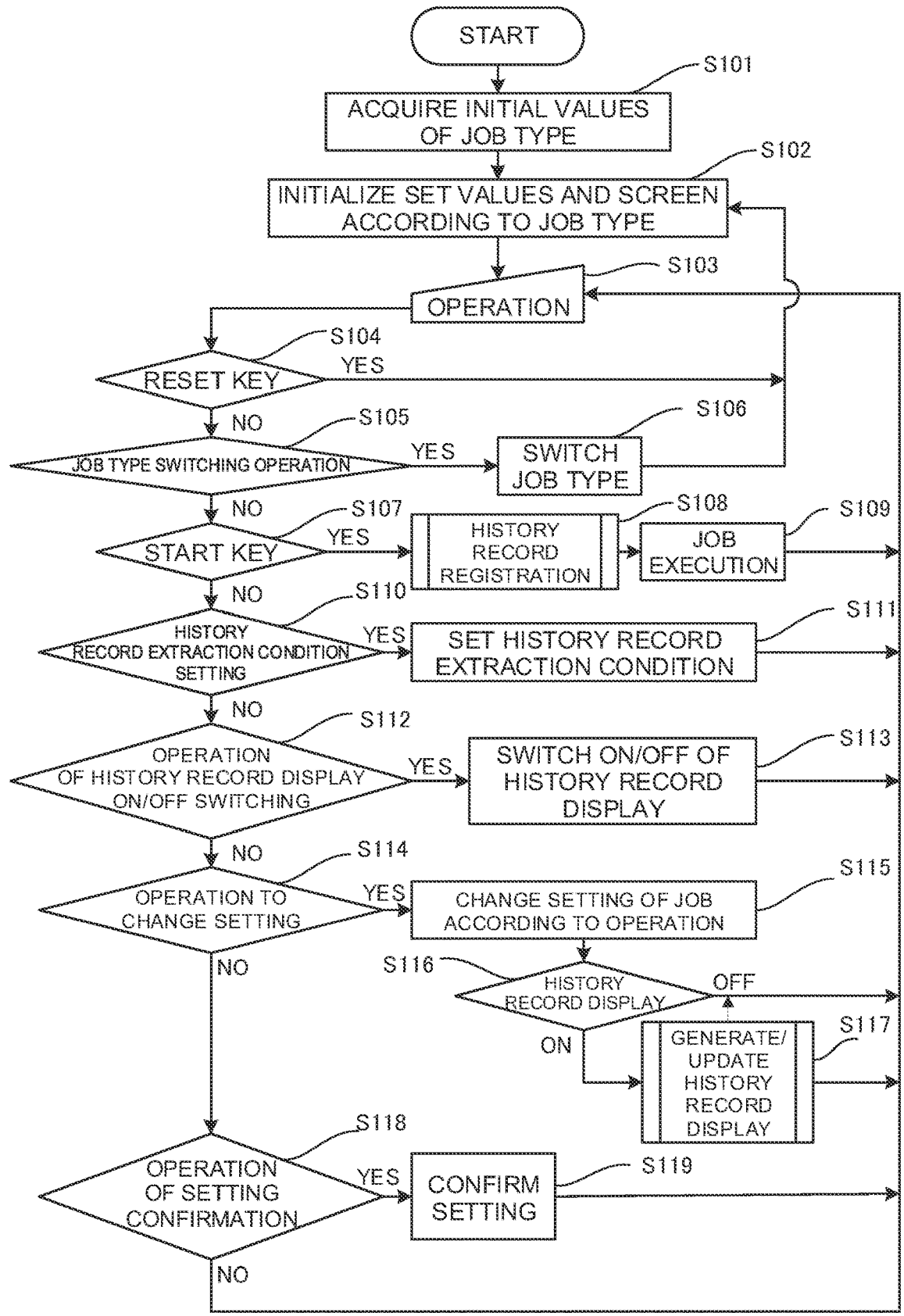
FIG. 3 is a flowchart illustrating job processing including setting processing for the image forming apparatus according to the first embodiment of the present invention.
Figure 4:
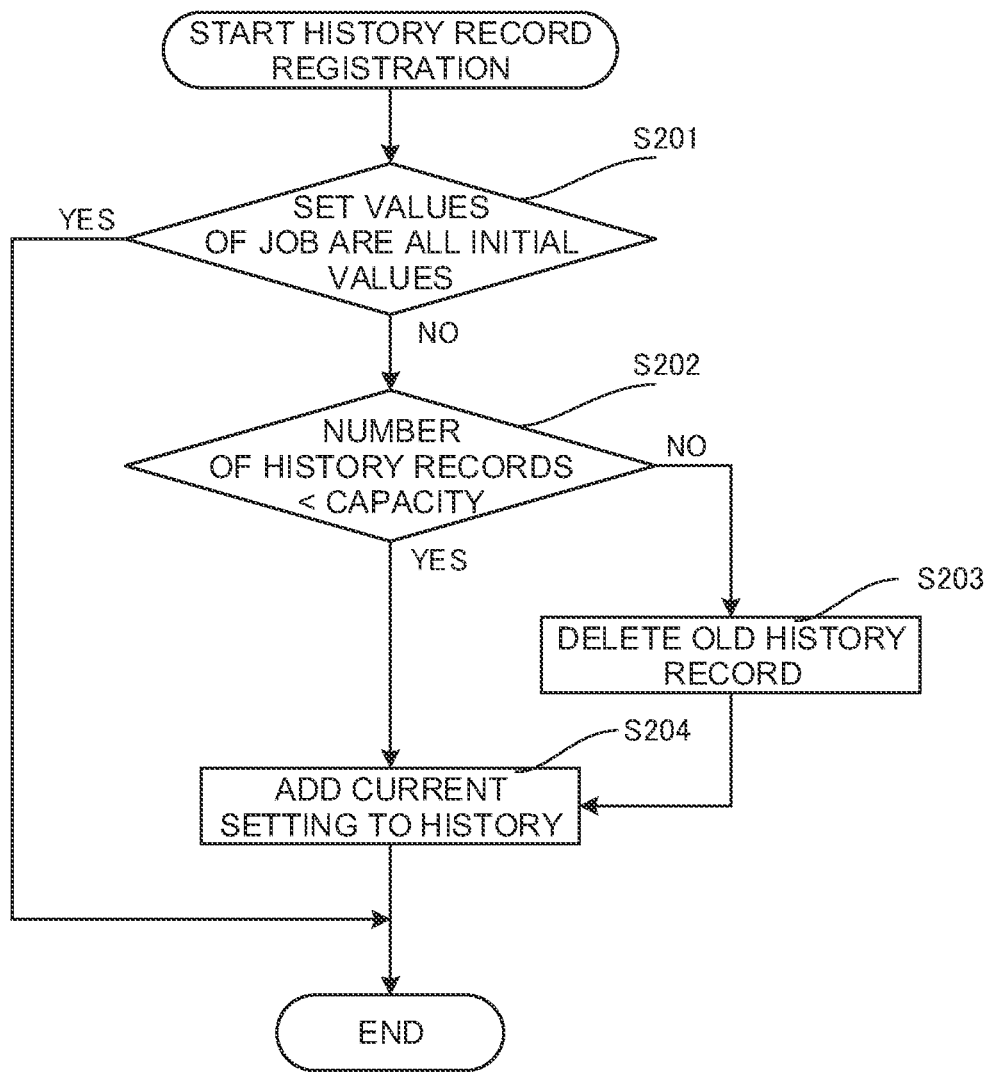
FIG. 4 is a flowchart illustrating history record registration processing.
Figure 5:
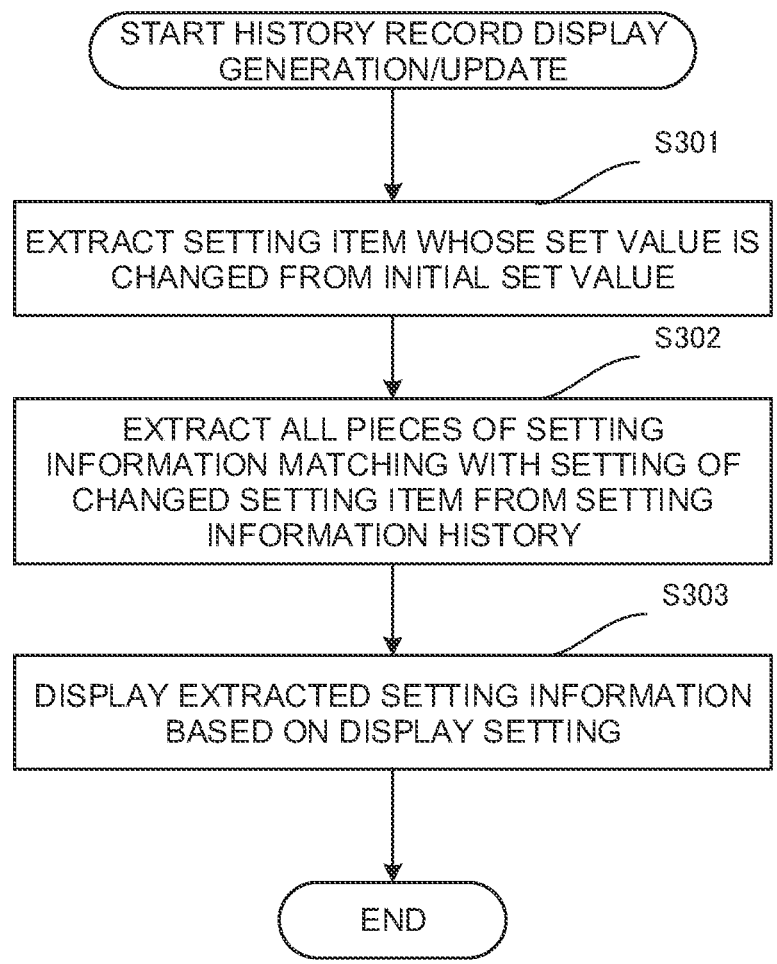
FIG. 5 is a flowchart illustrating processing of generating/updating history record display.
Figure 6:
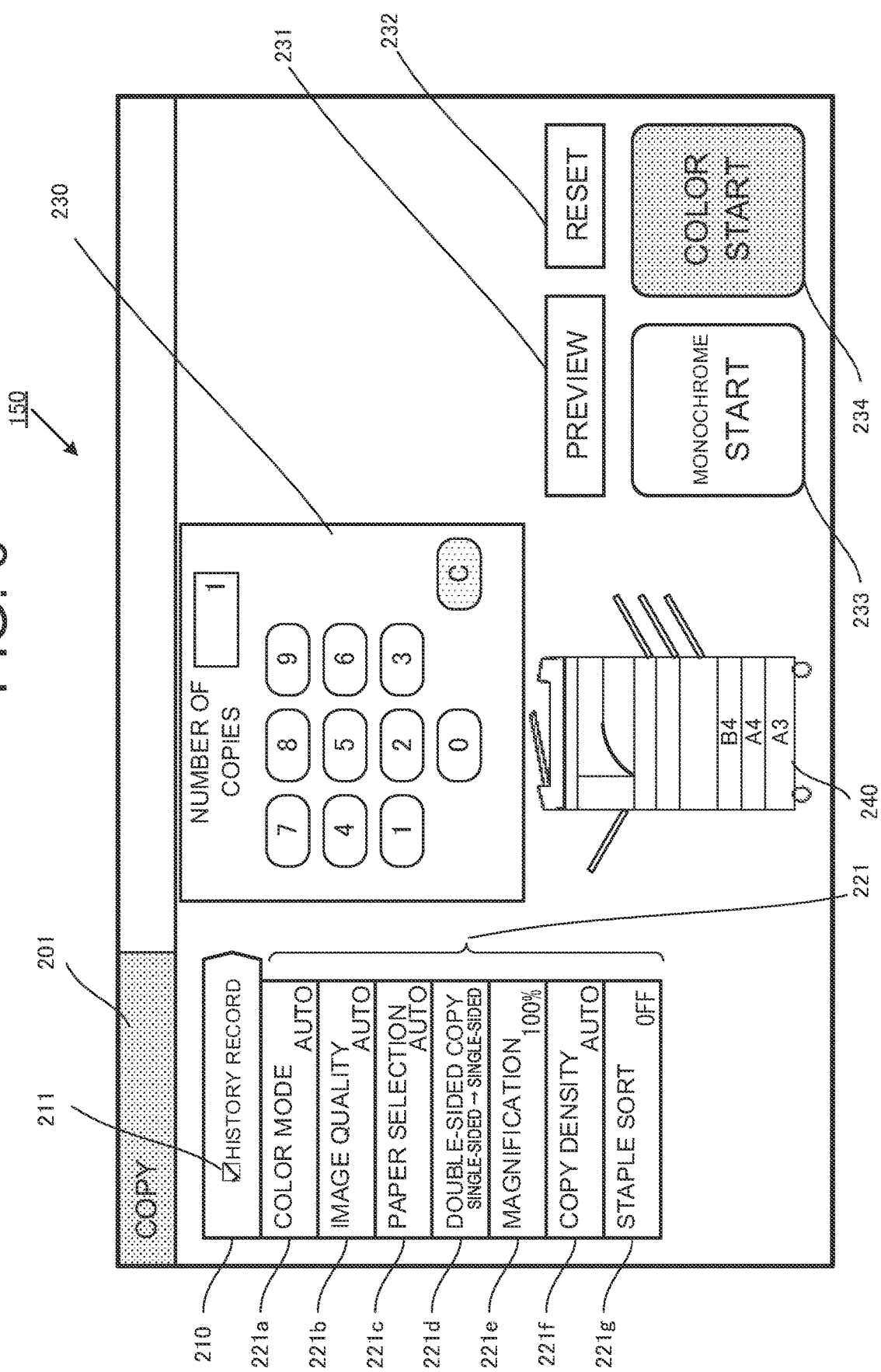
FIG. 6 is an explanatory diagram illustrating a setting screen of the image forming apparatus according to the first embodiment of the present invention.
Figure 7:
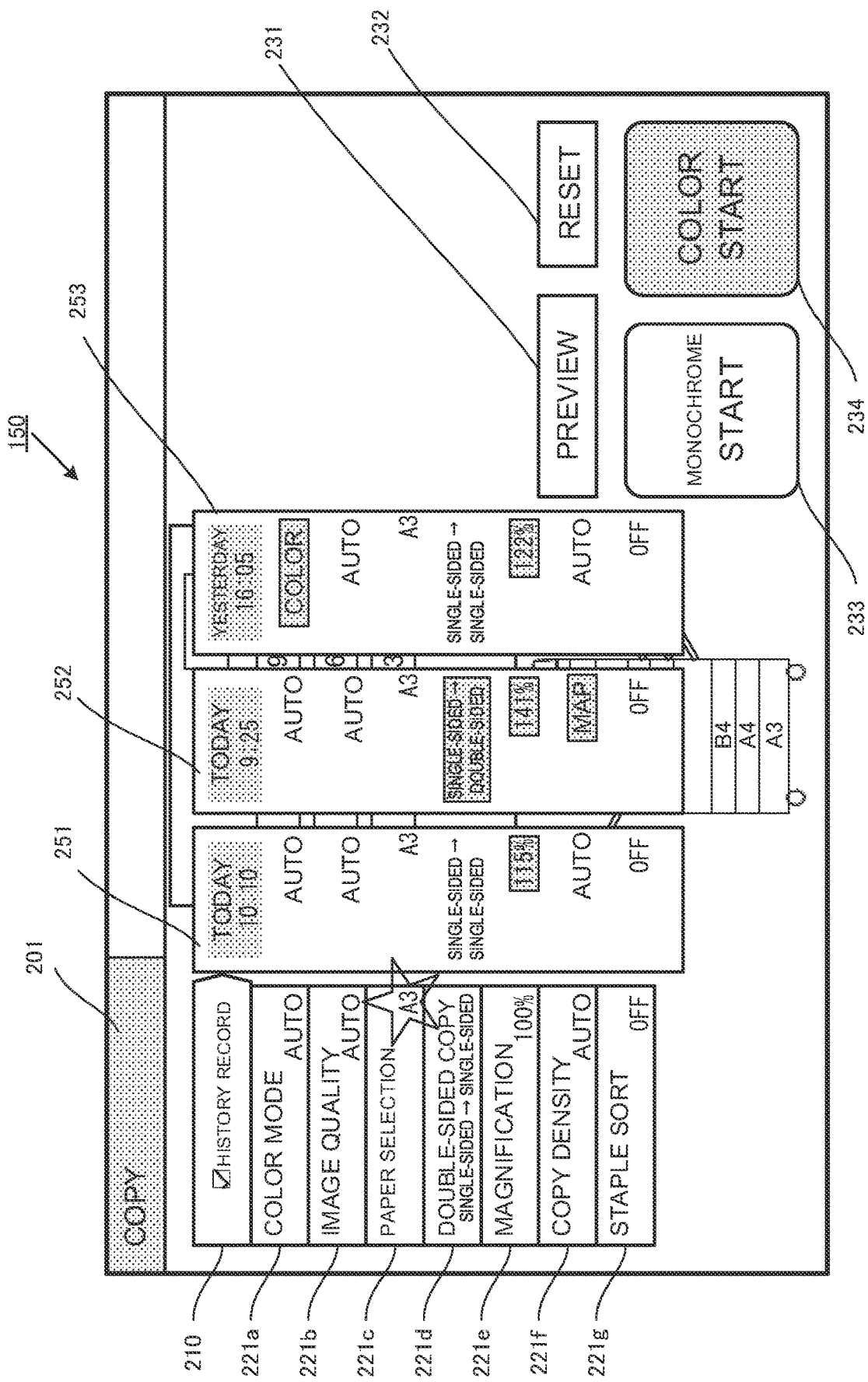
FIG. 7 is an explanatory diagram illustrating history record display on the setting screen of the image forming apparatus according to the first embodiment of the present invention.
Figure 8:
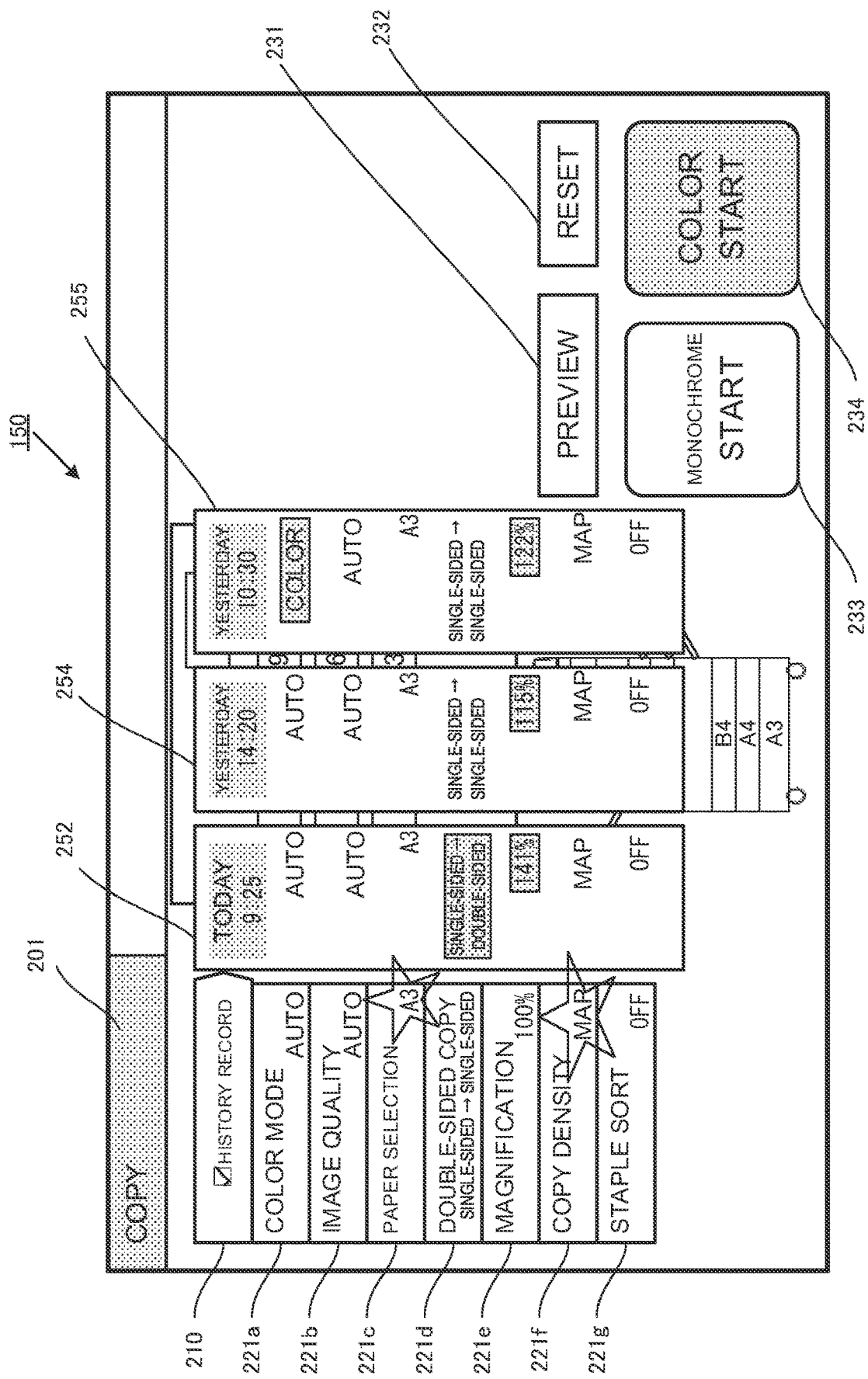
FIG. 8 is an explanatory diagram illustrating next history record display on the setting screen of the image forming apparatus according to the first embodiment of the present invention.

FIG. 1 is an explanatory diagram illustrating a configuration of an image forming apparatus according to a first embodiment of the present invention; FIG. 2 is a block diagram illustrating a configuration of the image forming apparatus; FIG. 3 is a flowchart; illustrating job processing including setting processing for the image forming apparatus; FIG. 4 is a flowchart illustrating history record registration processing; FIG. 5 is a flowchart illustrating processing of generating/updating history record display; FIG. 6 is an explanatory diagram illustrating a setting screen of the image forming apparatus; FIG. 7 is an explanatory diagram illustrating history record display on the setting screen of the image forming apparatus; and FIG. 8 is an explanatory diagram illustrating next history record display on the setting screen of the image forming apparatus.

Description of Outline

In an image forming apparatus 10 of the first embodiment, in making the setting of the image forming apparatus 10, each time an initial set value is changed through an operator, pieces of setting information that match with the changed set value are extracted from history. Then, the extracted pieces of setting information are displayed in chronological order in parallel with the current setting information.

Here, the setting information refers to information on the set value of a setting item with respect to job processing. Accumulation of pieces of setting information of the past that have been set by setting operations is called setting information history. An extraction of the setting information having a set value that matches with the changed set value from the setting information history is called history record display information.

Each Mode of Image Forming Apparatus

The image forming apparatus 10 shown in FIG. 1 is a multifunction peripheral (MFP), and includes a plurality of modes. The image forming apparatus 10 according to the present embodiment includes the modes described below.

The modes include an image forming mode for performing the image forming processing in the image forming apparatus 10, and a setting mode for making the setting of the image forming apparatus 10.

The image forming mode is a mode whereby general functions such as a copy function, a fax function, and a scanner function can be realized. When the image forming apparatus 10 is in a copy mode, a copy job can be executed.

Similarly, in a fax mode, a fax job can be executed, and in a scanner mode, a scanner job can be executed.

In the setting mode, the setting performing the processing of each job is input through the operator.

In the following, the copy job will be briefly described. First, a document is set on a document reader 130, and an operator 160 causes a copy operation to be performed. A user can confirm, on a display 150, the set document size, paper size, and copy settings the settings for copy such as single-sided print, double-sided print, or aggregate print).

When the user performs an operation to start a copy through the operator 160, copy processing is executed. Specifically, the document reader 130 reads the document set by the user. A controller 100 which will be described later generates image data from the document read by the document reader 130.

An image former 140 generates an image based on the image data on a sheet of paper conveyed from a paper tray 1410, and outputs the paper to a paper output tray 1420. In the present embodiment, the paper refers to a recording sheet or recording paper on which an image is to be formed. The paper may include not only ordinary plain paper, but also various paper media, such as cardboard and glossy paper, and a film or the like as long as an image can be formed thereon.

Next, the fax job will be briefly described.

When a fax is to be sent, a document is set on the document reader 130, and the operator 160 causes a fax sending operation to be performed. The user can confirm the set document size and transmission settings (a fax number or the like of the destination) on the display 150.

When the user performs an operation to start a fax transmission through the operator 160, fax processing is executed. The controller 100, which will be described later, performs procedures for communication with a communication counterpart by means of a communicator 170. Further, when a transmission-enabled state is ensured, the controller 100 performs necessary processing, such as changing the compression format of a compressed file, and then performs the processing of sequentially-transmitting the compressed file to the communication counterpart via a communication line.

Also, when a fax is to be received, the controller 100 receives the compressed file sent from the communication counterpart while performing the communication procedure by the communicator 170, and performs decompression processing on the received compressed file by a compression/decompression processor not illustrated. Further, various kinds of image processing on image data is performed, and the processed image data is output to the image former 140. The image former 140 forms an output image on the recording paper, on the basis of the output image data.

Next, the scanner job will be briefly described.

First, a document is set on the document reader 130, and the operator 160 causes a scanner operation to be performed. The user can confirm the set document size and output image settings (image file type, etc.) on the display 150.

When the user performs an operation to start a scan through the operator 160, scanner processing is executed. Specifically, the document reader 130 reads the document set by the user. The controller 100 which will be described later generates image data from the document read by the document reader 130.

The image forming apparatus 10 executes various jobs while combining the above-described functions (the copy function, the fax function, and the scanner function). In doing so, for a plurality of setting items of each job, each time the user performs an operation input of the setting, the set values previously set by operation from operation history are automatically extracted and the extracted set values are displayed by virtue of an auto-complete function.

Regarding the setting mode of the image forming apparatus, as the user operates the operator 160 to activate the setting mode, the controller 100 of the image forming apparatus 10 causes the setting mode to be displayed on a screen of the display 150. Here, the initial set values of the setting items are displayed, and the setting items are allowed to be changed through the operator 160.

Functional Configuration of Image Forming Apparatus

A functional configuration of the image forming apparatus 10 will be described with reference to FIG. 2.

The controller 100 is a functional part for controlling the image forming apparatus 10 as a whole. The controller 100 realizes various functions by reading and executing a control program 121 stored in a storage 120, and is composed of one or more computing devices (such as a central processing unit [CPU]). The functions realized by the controller 100 will be described below.

The controller 100 has a setting processing function of performing setting processing in the setting mode, an image forming processing function of performing image forming processing in the image forming mode, and the like. The controller 100 executes the copy function, the fax function, the scanner function, and the like, as the image forming processing function.

The storage 120 is a functional part where a program and data are stored. The storage 120 is composed of, for example, a semiconductor memory such as a solid-state drive (SSD), or a hard disk drive (HDD).

The storage 120 stores the control program 121, document image data 122, initial set, values 123, and setting information history 124.

The control program 121 is a program related to operation control of the image forming apparatus 10. The document image data 122 is image data of a document read by the document reader 130.

The initial set values 123 correspond to information indicating the initial set values of various setting items 221 of the image forming apparatus 10.

The setting information history 124 corresponds to information related to the past setting information of the image forming apparatus 10.

The document reader 130 is intended to read an image of the document, and is composed of, for example, a scanner device including a device that converts optical information into electric signals, such as a contact image sensor (CIS) or a charge-coupled device (CCD).

For example, the document reader 130 reads the document placed on a placement table within a range set by the document size. Note that the document may be set on the placement table, or on an automatic document feeder (ADF: Auto Document Feeder).

The image former 140 is a functional part for forming an image of image data on a recording medium (a recording sheet, for example). For example, the recording sheet is fed from the paper tray 1410 shown in FIG. 1, and after an image has been formed on the surface of the recording sheet in the image former 140, the recording sheet is discharged from the paper output tray 1420. The image former 140 is composed of, for example, an electrophotographic laser printer.

Also, one or more paper trays 410 are usually provided to store sheets of paper therein.

The display 150 displays various states of the image forming apparatus 10, and also the state of the operation input. For example, the display 150 is composed of a liquid crystal display (LCD), an organic electroluminescent (EL) panel, electronic paper using electrophoresis, or the like.

The operator 160 is a button, a switch, or the like that receives an operation input from the user. The operator 160 may be realized by hardware input devices such as a switch and a keyboard, or by a touch panel or the like formed integrally with the display 150. In this case, the scheme for detecting an input on the touch panel may be any typical detection scheme such as the scheme employing a resistive film, infrared ray, electromagnetic induction, or capacitance.

The operator 160 of the present embodiment is provided with a hardware input device and a touch panel of the display 150, and the aforementioned elements can be operated individually.

The communicator 170 communicates with other devices. For example, it suffices that the communicator 170 includes an interface connectable to a network, and can communicate with the other devices via a wired or wireless local area network (LAN). Note that image data may be sent to or received from the other device (a universal serial bus (USB) memory stick, for example) via a USB interface, etc. Further, the communicator 170 can connect to a communication network such as a public network, a local area network (LAN), or the Internet. The communicator 170 can also send a compressed file to the outside via the communication network by means of a communication method such as a facsimile or an e-mail.

The image forming apparatus 10 may further be provided with a necessary function in addition to the above-described structures. For example, the image forming apparatus 10 may be provided with such a management portion as a billing management portion which allows the image forming apparatus 10 to be used only when a fee is paid by the user.

Setting Processing of Image Forming Apparatus

The setting processing of the image forming apparatus will be described referring to FIG. 3.

First, when the user selects a job type, the controller 100 of the image forming apparatus 10 acquires the initial set values 123 of the selected job type from the storage 120 (step S101). Then, the controller 100 initializes the set values and the screen according to the job type, and displays the initial set values 123 on the display 150 (step S102).

The user uses the operator 160 to perform an operation (step S103), and the controller 100 of the image forming apparatus 10 proceeds with the processing described below by checking what kind of operation has been performed.

The controller 100 checks whether a reset key has been pressed (step S104). The processing returns to step S102 if the reset key has been pressed, and proceeds to step S105 if the reset key has not been pressed.

In step S105, the controller 100 checks whether a switching operation for the job type has been performed. If the switching operation for the job type has been performed, the controller switches the job type (step S106), and the processing returns to step S102. If the switching operation for the job type has not been performed, the processing proceeds to step S107.

In step S107, the controller 100 checks whether a start key has been pressed. If the start key has been pressed, the controller 100 registers a history record of the setting information (step S108), and executes the job (step S109). Then, when the job is finished, the processing returns to step S103. Meanwhile, the processing proceeds to step S110 if the start key has not been pressed.

Alternatively, the history record registration processing of step S108 may be performed after the job execution of step S109.

The history record registration processing of step S108 will be described later.

In step S110, the controller 100 checks whether a setting operation for history record extraction condition has been performed. If the setting operation for history record extraction condition has been performed, the controller 100 sets the history record extraction condition (step S111), and the processing returns to step S103. If the setting operation for history record extraction condition has not been performed, the processing proceeds to step S112. The history record extraction condition is defined by a folder name of the storage 120 from which the history records are extracted, and the range of extraction (i.e., information up to the point of three months ago, for example, from the present time). Also, a display condition of the history record is set. The above setting includes, for example, the setting for performing parallel display (such as in chronological order), and the setting for displaying a point of discrepancy, which is the point being different from the current set value, to be conspicuous.

In step S112, the controller 100 checks whether an ON/OFF switching operation for history record display has been performed. If the ON/OFF switching operation for history record display has been performed, the controller 100 switches the ON/OFF of the history record display (step S113), and the processing returns to step S103. If the ON/OFF switching operation for history record display has not been performed, the processing proceeds to step S114. The ON/OFF state of the history record display is indicated on a setting screen so that the user can check the ON/OFF state.

In step S114, the controller 100 checks whether an operation to change the setting has been performed with respect to the initial values of the various setting items 221. If the operation to change the setting has been performed, the controller 100 changes the setting of the job according to the operation (step S115). Here, the setting item is merely changed and is yet to be confirmed. The setting information, the setting item of which is changed but is yet to be confirmed, is referred to as changed setting information.

Further, the controller 100 checks the ON/OFF of the history record display (step S116), and if the history record display is OFF, the processing returns to step S103. If the history record display is ON, the controller 100 generates/updates the history record display (step S117), and the processing returns to step S103.

If no operation to change the setting has been performed, the processing proceeds to step S118.

The history record display generation/update processing of step S117 will be described later.

In step S118, the controller 100 checks whether an operation to confirm the setting has been performed. For example, the controller 100 checks whether an operation has been performed to select the current setting that has been set by the operator 160 for confirmation, or select the displayed setting history record for confirmation. When the operation to confirm the setting has been performed, the set value of the selected setting information is confirmed as the current setting (step S119), and the processing returns to step S103. If no operation to confirm the setting has been performed, the processing returns to step S103. The setting information for which a confirming operation has been performed is referred to as confirmed setting information.

Next, the processing of the history record registration of step S108 will be described referring to FIG. 4.

The controller 100 checks whether all of the set values of the job are the initial values (step S201). If not all of the set values are the initial values, the controller 100 confirms that a capacity consumed by the number of history records is less than a capacity of the storage 120 (step S202). If the capacity consumed by the number of history records is less than the capacity of the storage 120, the current confirmed setting information is added to the history (step S204). If the capacity consumed by the number of history records becomes greater than the capacity of the storage 120, the controller 100 deletes the old history record (step S203), and the processing proceeds to step S204. In step S204, the current confirmed setting information is added to the history.

Next, the processing of generating/updating the history record display of step S117 will be described referring to FIG. 5.

The controller 100 extracts the setting item whose set value is changed from the initial set value (step S301). Then, all pieces of setting information (history record display information) in which the set values match with the set value of the changed setting item (changed setting information) are extracted from the setting information history 124 that is stored in the storage 120 (step S302). Accordingly, if the setting items are changed, pieces of setting information to be extracted are also changed in accordance with the change.

Next, the controller 100 displays the extracted setting information (history record display information) on the basis of the history record extraction condition which has been set in step S111 (step S303). In the first embodiment, the history record display information is displayed in chronological order. Thus, pieces of the past setting information are displayed, starting with the latest setting information. In addition, by highlighting the points of discrepancies relative to the set values of the various setting items 221 displayed on the setting screen, the user is enabled to confirm the discrepancies at a glance. For example, the color used to display the point of discrepancy may be changed to a conspicuous color, or the characters may be displayed in bold or surrounded by a box. Moreover, points of agreement with the set values of the various setting items 221 being displayed on the setting screen may be displayed in a pale color, or the characters may be displayed with thin lines or made translucent.

Regarding Specific Setting Processing for Image Forming Apparatus

A specific example of the setting processing will be described referring to the setting screens shown in FIGS. 6 to 8.

When the user switches the mode to a setting mode for a copy job through the operator 160, the setting screen is displayed on the display 150 of the image forming apparatus 10, as shown in FIG. 6. On the display 150, a job type display 201, a history record ON/OFF display 210, various setting items 221 (color mode 221a, image quality 221b, paper selection 221c, double-sided copy 221d, magnification 221e, copy density 221f, and staple sort 221g), a number-of-copies input, display 230, a paper layout 240 in image forming apparatus, a preview button 231, a reset button 232, a monochrome start button 233, and a color start button 234 are displayed.

The history record ON/OFF display 210 indicates that the history record display is ON when a check mark is entered in a check box 211, and indicates that the history record display is OFF when a check mark is not entered in the check box 211. If the history record display is ON, the history record display information is displayed, and if the history record display is OFF, the history record display information is not displayed.

In the various setting items 221, the initial set values are displayed when the setting screen is first displayed.

As shown in FIG. 7, it is assumed that the user has changed the set value of the paper selection 221c, which is one of the setting items of the various setting items 221, from "auto" to "A3". A mark of a star indicates the changed place. The controller 100 extracts history records in which the set value of the paper selection 221c is "A3" from the setting information history 124 in the storage 120. When more than one history record is found, those history records are displayed to the side of the various setting items 221 in parallel in chronological order. The history records are displayed in chronological order, that is, the latest one at the head, followed by older ones, on the right side of the various setting items 221. If there is only one piece of extracted setting information (history record display information), such information alone is displayed. The date and time of the setting is displayed at the upper part of the history record display. On the screen, while three pieces of setting information (history record display information) 251, 252, and 253 are displayed in chronological order, the number of pieces of setting information to be displayed is not limited. If the pieces of setting information cannot all be displayed, they may be scrolled, for example, and displayed.

In the history record display, parts having discrepancies relative to the set values of the various setting items 221 are displayed clearly and highlighted. For example, the color of the parts having discrepancies relative to the various setting items 221 may be changed, or such parts may be surrounded by a box or the characters may be displayed in bold. Alternatively, for parts having the same set values as those of the various setting items 221, the characters may be displayed lightly or made translucent.

Furthermore, when the set value of the copy density 221f is changed from "auto" to "map", the history record display information is changed, as shown in FIG. 8. That is, pieces of setting information (history record display information) are newly extracted from the setting information history 124, and displayed in chronological order. In this case, the paper selection 221c is changed to "A3", and the copy density 221f is changed to "map". Therefore, the controller 100 extracts the history records of the match, more specifically, the history records in which the paper selection 221c is "A3" and the copy density 221f is "map", from the setting information history 124. In this way, each time the user changes the setting item, the related history record display information is automatically displayed accordingly. Thus, it is possible to save the user's time and effort, and the setting operation becomes efficient.

In addition, the history record display information for display is indicated in parallel in chronological order as setting information 252, 254, and 255 to the side of the various setting items 221. Further, as in FIG. 7, the points of discrepancies relative to the set values of the various setting items 221 are displayed clearly. As described above, the present embodiment performs the display such that the user can easily compare the set values of the various setting items 221, and that the parts having discrepancies relative to the set values of the various setting items 221 are clarified in the display. Therefore, it is possible for the user to easily compare the settings.

Second Embodiment

In the following, a second embodiment of the present invention will be described with reference to the drawing.

Figure 9:
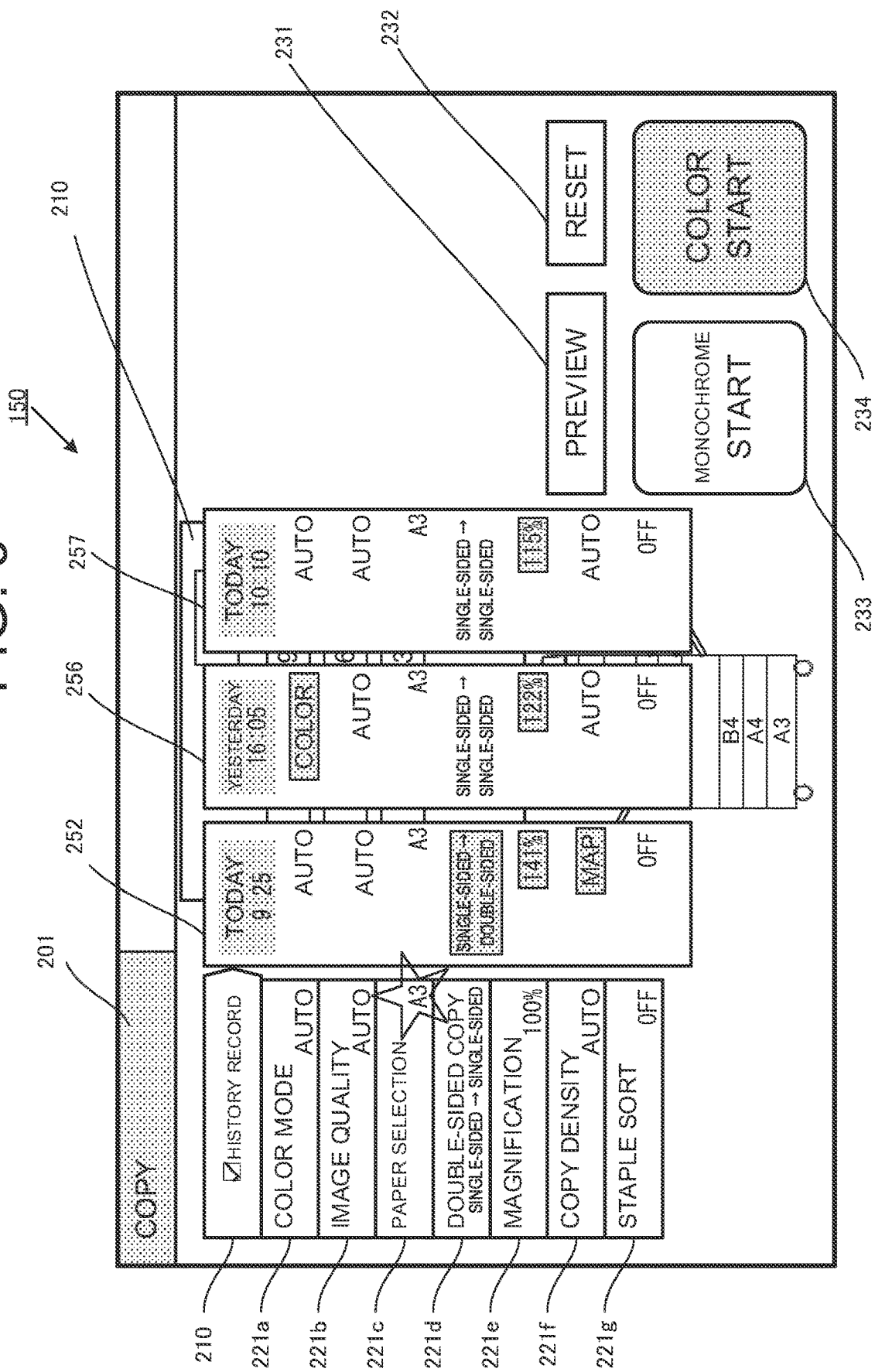
FIG. 9 is an explanatory diagram illustrating history record display on a setting screen of an image forming apparatus according to a second embodiment of the present invention.

FIG. 9 is an explanatory diagram illustrating history record display on a setting screen of an image forming apparatus according to the second embodiment of the present invention.

Description of Outline

In an image forming apparatus 10 of the second embodiment, in displaying history record display information extracted from setting information history, the history record display information is displayed in parallel in descending order of the number of points of discrepancies relative to set values of various setting items 221.

Since the configuration and the processing procedure of each unit, are substantially the same as those of the first embodiment, the same parts will not be described.

The difference is that in step S111 of FIG. 3, as regards the history record extraction condition, history records are extracted in descending order of the number of points of discrepancies relative to the set values of the various setting items 221, instead of in chronological order.

Regarding Specific Setting Processing for Image Forming Apparatus

A specific example of the setting processing will be described referring to the setting screen shown in FIG. 9.

It is assumed that the user has switched the mode to a setting mode for a copy job through an operator 160, and changed the setting of a paper selection 221c, which is the setting item, from "automatic" to "A3". A controller 100 extracts history records in which the paper selection 221c is "A3" from setting information history 124 in a storage 120, and displays those history records to the side of the various setting items 221 in parallel.

The controller 100 displays pieces of setting information 252, 256, and 257 from left to right to the side of the various setting items 221 in descending order of the number of points of discrepancies relative to the set values of the various setting items 221. In displaying the set values of the pieces of setting information 252, 256, and 257, parts having discrepancies relative to the set values of the various setting items 221 are displayed clearly and highlighted. For example, the color of the parts having discrepancies relative to the set values of the various setting items 221 may be changed, or such parts may be surrounded by a box or the characters may be displayed in bold. Alternatively, for parts having the same set values as those of the various setting items 221, the characters may be displayed lightly or made translucent.

As can be seen, history information with many points of discrepancies relative to the set values of the various setting items 221 refers to information in which the settings of many items have been changed from the initial values. By displaying the history records that have more changed set values to the side of the various setting items 221, the user is enabled to easily perform a complicated setting operation.

Third Embodiment

In the following, a third embodiment of the present invention will be described with reference to the drawing.

Figure 10:
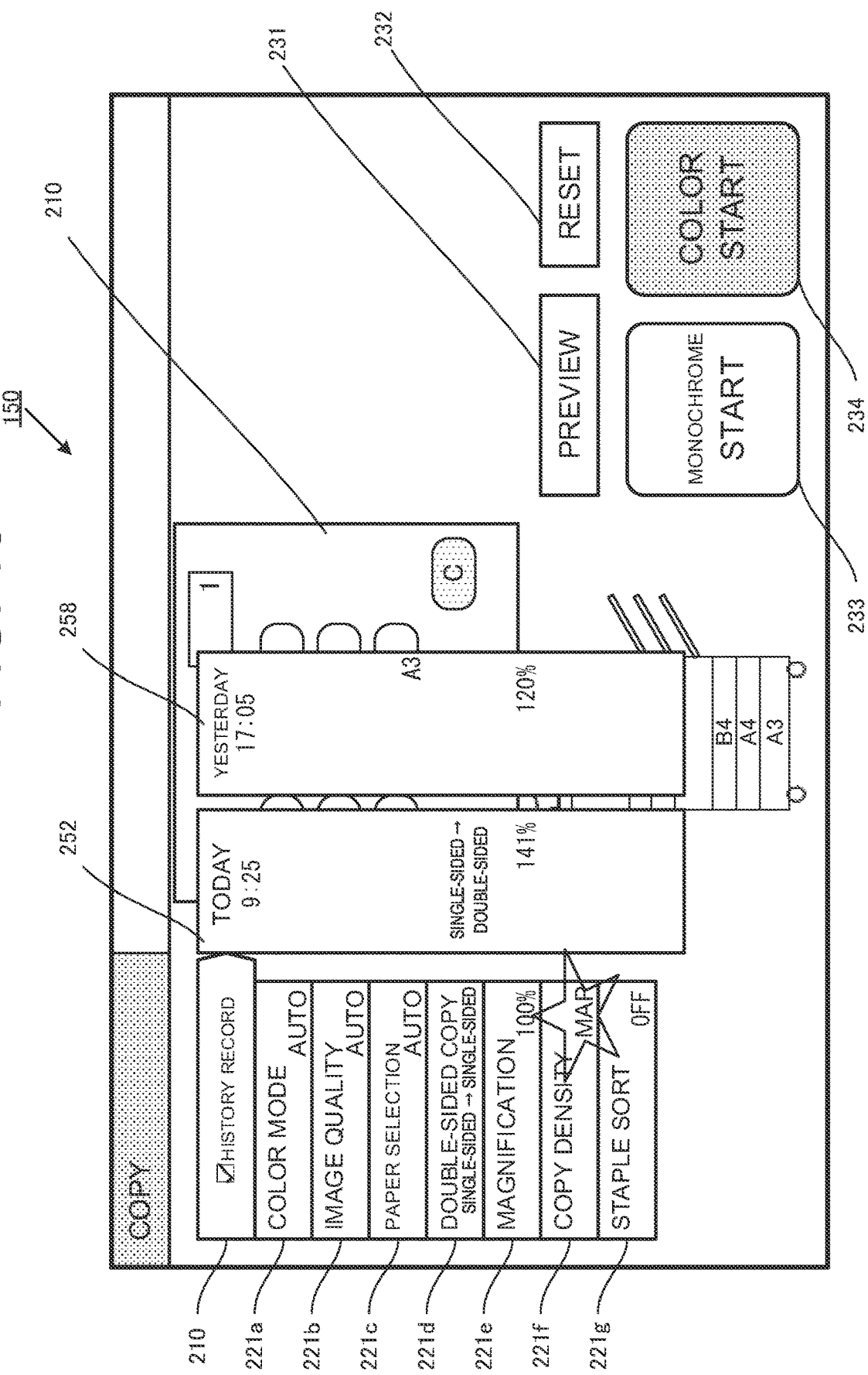
FIG. 10 is an explanatory diagram illustrating history record display on a setting screen of an image forming apparatus according to a third embodiment of the present invention.

FIG. 10 is an explanatory diagram illustrating history record display on a setting screen of an image forming apparatus according to the third embodiment of the present invention.

Description of Outline

In the third embodiment, in displaying history record display information extracted from setting information history, the history record display information is displayed in parallel in chronological order. However, points of agreement with the displayed changed setting information are not displayed.

Since the configuration and the processing procedure of each unit are the same as those of the first embodiment, they are omitted from the description.

Regarding Specific Setting Processing for Image Forming Apparatus

A specific example of the setting processing will be described. referring to the setting screen shown in FIG. 10.

It is assumed that the user has switched the mode to a setting mode through an operator 160, and changed the set value of a copy density 221f, which is one of various setting items 221, from "auto" to "map". A controller 100 extracts history records in which the set value of the copy density 221f is "map" from setting information history 124 in a storage 120, and displays pieces of setting information 252 and 258 to the side of the various setting items 221 in parallel in chronological order. Here, since the points of agreement between the set values of each of the pieces of setting information 252 and 258 and the set values of the various setting items 221 are displayed in the various setting items 221, they are not displayed in the setting information 252 and 258. By doing so, since only the points of discrepancies are displayed to the user, the user can confirm the differences at a glance.

The embodiments of the present invention have been described in detail with reference to the accompanying drawings. However, the specific configuration is not limited to the configurations of the embodiments, and an invention with a design change or the like not departing from the spirit of the present invention is also included in the present invention.

What is claimed is:

1. An image forming apparatus which performs job processing based on setting information, which is information on a set value of a setting item, the image forming apparatus comprising:
    a display which displays a setting screen;
    a storage which stores an initial set value of the setting item, and setting information history which is configured by accumulation of the past setting information; and
    a controller which executes setting processing of determining the set value of the setting item, and the job processing, wherein
    the controller extracts, each time the set value of the setting item is changed from the initial set value, at least one piece of setting information including the changed set value from the setting information history, and displays the extracted setting information as history record display information in such a way that the history record display information is selectable, and together with the present setting information, on the display.

2. The image forming apparatus according to claim 1, wherein the controller displays the history record display information side by side in chronological order.

3. The image forming apparatus according to claim 1, wherein the controller displays the history record display information side by side in descending order of a number of points of discrepancies relative to the present setting information.

4. The image forming apparatus according to claim 1, wherein the controller displays the history record display information such that points of discrepancies relative to the present setting information.

5. The image forming apparatus according to claim 4, wherein the controller displays the history record display information such that points of agreement with the present setting information.

6. The image forming apparatus according to claim 1, wherein the controller displays the setting information having the points of discrepancies relative to the present setting information as the history record display information.

7. A method of controlling an image forming apparatus which performs job processing based on setting information, which is information on a set value of a setting item, the method comprising:
  displaying a setting screen;
  storing an initial set value of the setting item, and setting information history which is configured by accumulation of the past setting information; and
  controlling of executing setting processing of determining the set value of the setting item, and the job processing, wherein
  the controlling extracts, each time the set value of the setting item is changed from the initial set value, at least one piece of setting information including the changed set value from the setting information history, and displays the extracted setting information as history record display information in such a way that the history record display information is selectable, and together with the present setting information, in the displaying.

* * * * *